ELECTRICAL DIGITAL COMPUTING ENGINES

Filed July 13, 1964 3 Sheets-Sheet 1

David Stone Inventor
By
Cushman, Darby & Cushman
Attorneys

Oct. 24, 1967 D. STONE 3,349,377

ELECTRICAL DIGITAL COMPUTING ENGINES

Filed July 13, 1964 3 Sheets-Sheet 2

David Stone Inventor
By
Cushman, Darby & Cushman
Attorneys

Oct. 24, 1967 D. STONE 3,349,377

ELECTRICAL DIGITAL COMPUTING ENGINES

Filed July 13, 1964 3 Sheets-Sheet 3

David Stone Inventor
By Cushman, Darby & Cushman
Attorneys

United States Patent Office 3,349,377

Patented Oct. 24, 1967

3,349,377

ELECTRICAL DIGITAL COMPUTING ENGINES

David Stone, Woking, Surrey, England, assignor to National Research Development Corporation, London, England Filed July 13, 1964, Ser. No. 382,213
Claims priority, application Great Britain, July 15, 1963, 27,906/63
16 Claims. (Cl. 340—172.5)

ABSTRACT OF THE DISCLOSURE

An electrical digital computing engine having a plurality of ordinary storage locations and at least one block of special storage locations having means for converting words written into the block of special locations into different logical functions thereof available at correspondingly different special location source addresses. The block of special locations has a common input with a common destination address so that every location in the block is filled when the block of special locations is addressed.

The present invention relates to electrical digital computing engines.

Electrical digital computing engines are often organised as follows. Numbers on which mathematical calculations are to be performed are represented by trains of electric pulses. These trains of pulses are called number words. Further trains of pulses represent instructions to the engine, determining the particular calculations to be performed. These further trains of pulses are called instruction words. It is often unambiguous to refer to number words and instruction words merely as "words."

In the past the engines have included at least a store and a control unit. The function of the store is to hold both number words and instruction words. Calculations are performed by the transfer of words between storage locations under the control of the control unit which is under the control of the instruction words. The transfers may be between a storage location and a special location called an accumulator, or may be between two ordinary locations in the store via a function unit designed to perform the calculation. The location from which the word is extracted is called the source and the location to which it is transferred is called the destination. Every location in the store has a separate number assigned to it, and this number is called the address of the location.

For example, if it is required to add two numbers together they may be applied together to a storage location via an adder unit. In the case of an engine possessing an accumulator, the addend is transferred to the accumulator and the augend is added to it by means of an adder which is part of the accumulator.

Other transfers may be simple transfers; for the purposes of the present specification a simple transfer is defined as one in which the word emerging from a source location is the same as the word which is applied during the same transfer to a destination location. In conventional computing engines simple transfers do not effect calculations. However, a saving in equipment may be possible if all transfers are simple so that the computing engine contains no function unit and no accumulator.

According to the present invention there is provided an electrical digital computing engine including a store have at least one block of special locations which is so constructed that when words are written into the block of special locations sufficient logical functions of the words are made available to enable calculations to be performed by series of simple transfers as hereinbefore defined.

Embodiments of the invention now will be described, by way of example, with reference to the accompanying drawings, in which.

*Store*

Figure 1:
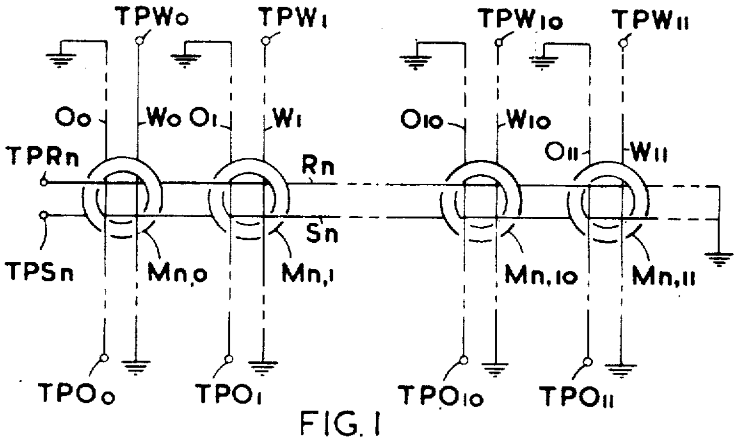
FIGURE 1 is a circuit diagram of part of a magnetic core store.

FIGURE 1 is a diagram of part of a magnetic core store. The rows are numbered 0, 1, 2, . . . and the colranged in a rectangular matrix. The number of columns in the matrix is the same as the number of digits in a word. In the embodiment described there are assumed to be 25 digits in a word. The number of rows in the matrix is the same as the number of storage locations in the core store. The rows are numbered 0, 1, 2, . . . and the columns are numbered 0, 1, 2, . . ., 25. In the present specification the core in row *i* and column *j* will be called the core $M_{i,j}$. In the figure the four cores $M_{n,0}$, $M_{n,10}$ and $M_{n,11}$ from the row *n* are shown.

The cores illustrated are toroidal in shape and are made of a magnetic material having a substantially rectangular hysteresis loop. The result is that a core can assume one of two stable saturated magnetic states but is unlikely to assume any unsaturated magnetic state. If $I_s$ is the minimum current in a wire threading a core needed to change the state of the core than a current $\frac{1}{2}I_s$ is not large enough to change its state, and it remains in its original magnetic state. The two stable magnetic states will be referred to hereinafter as the "0" state and the "1" state, and the expression "to turn a core" will be used to denote "to change the magnetic state of a core."

In the figure a select wire $S_n$, connected between a terminal $TPS_n$ and earth, threads all the cores in the row, which is assumed to be the *n*th row of the matrix. The cores are also threaded by a read wire $R_n$ connected between a terminal $TPR_n$ and earth. The read wire $R_n$ threads the cores in the opposite sense to the select wire $S_n$. Furthermore, all the cores in each column of the matrix are threaded by a single write wire and a single output wire. In the drawing the write wire threading the cores in the row O is labelled $W_0$, that threading the cores in the row 1 is labelled $W_1$, that threading the cores in the row 10 is labelled $W_{10}$ and that threading the cores in the row 11 is labelled $W_{11}$. The output wires are correspondingly labelled $O_0$, $O_1$, $O_{10}$ and $O_{11}$ respectively. The wires $W_0$, $W_1$, $W_{10}$ and $W_{11}$ are connected between four separate terminals $TPW_0$, $TPW_1$, $TPW_{10}$ and $TPW_{11}$ respectively and earth and the wires $O_0$, $O_1$, $O_{10}$, and $O_{11}$ are connected between earth and four separate terminals $TPO_0$, $TPO_1$, $TPO_{10}$ and $TPO_{11}$ respectively.

The action of the circuit is as follows. When a word is to be written into a row of the store, say the row *n* illustrated, a current $\frac{1}{2}I_s$ is made to flow in the select wire $S_n$ from the terminal $TPS_n$ to earth, and a current $\frac{1}{2}I_s$ is made to flow in each of the write wires $W_0$, $W_1$ . . ., $W_{10}$, $W_{11}$, . . . which threads a core in which a digit 1 is to be stored. Current in any of the write wires $W_0$, $W_1$, . . . $W_{10}$, $W_{11}$, is made to flow from the corresponding terminal $TPW_0$, $TPW_1$, $TPW_{10}$, $TPW_{11}$, respectively to earth. Suppose for example, the digits to be stored in the cores $M_{n,0}$, $M_{n,1}$, $M_{n,10}$, and $M_{n,11}$ are 0, 1, 0 and 1 respectively. Then the total current in the wires threading the core $M_{n,0}$ is $\frac{1}{2}I_s$, in the wire $S_n$, no other wire threading the core carrying any current. The total current in the wires threading the core $M_{n,1}$ is $I_s$, made up of $\frac{1}{2}I_s$ in the wire $S_n$ and $\frac{1}{2}I_s$ in the wire $W_1$, which threads the core in such a sense that the two $\frac{1}{2}I_s$ currents are added to each other. Similarly the total currents in wires threading the cores $M_{n,10}$ and $M_{n,11}$ are $\frac{1}{2}I_s$ and $I_s$ respectively. The senses in which the cores are threaded are such that, provided that all the cores have been put in the "0" state initially the cores which are threaded by wires carrying a total current of $I_s$ are put into the "1" state and the cores which are threaded by wires carrying a total current of $\frac{1}{2}I_s$ remain in the "0" state. In this case, therefore, the cores $M_{n,1}$ and $M_{n,11}$ will be put into the "1" state. It is to be noted that no core in any row other than the row *n* illustrated will be put into the "1" state since its select wire corresponding to the wire $S_n$ will not carry any current and so the total current through the wires threading any such core cannot be greater that $\frac{1}{2}I_s$.

When it is desired to read the contents of a row such as the row *n* of the store a current of $I_s$ is caused to flow in the wire $R_n$ from the terminal $TPR_n$ to earth. This has no effect on the cores already in the "0" state, tending to drive them further into the "0" state; but the cores in the "1" state it puts back into the "0" state. This has the effect of generating a voltage in the output wire such as $O_0$, $O_1$, . . . , $O_{10}$, $O_{11}$, . . . linking the core concerned. The voltage may be detected at the terminal $TPO_0$, $TPO_1$, . . . , as the case may be.

The foregoing description appertains to a linear select, or word-organised core store. Alternatively a coincident current core store may be employed. Those skilled in the art will be aware of this type of core store, which may be organised as follows.

The magnetic cores are arranged in a number *s* of rectangular core matrices, each matrix containing *n* x *m* cores, where *s* is the number of digits in each word and the capacity of the store is *nm*. All the cores in each separate matrix are arranged to store digits of the same separate significance and are consequently threaded by the same write and output wires. Each core in a matrix has two select wires, one of which is common to all the cores in the same row and one of which is common to all the cores in the same column. The word in the *ij* the address of the store is selected by causing a current of $\frac{1}{3}I_s$ to flow in the *i*th select wires of all the matrices and a similar current to flow in the *j*th select wires. A current of $\frac{1}{3}I_s$ is made to flow in the write wires of those matrices in the *ij* core of which a digit "1" is to be stored.

In either form of core store when the contents of a location, that is to say a row of the store, are read out all the cores in that location are reset to the "0" state and a new word can be written into the location without the necessity of clearing the store again. If a second word is written into a store which has not been cleared then the resulting word will be the logical sum of the original words, where the logical sum $A \oplus B$ of two words A and B is defined as the word having a digit $a_i \oplus b_i$ as its *i*th binary digit, where $a_i$ and $b_i$ are the *i*th binary digits of A and B respectively, and $a_i \oplus b_i$ is given by $$\text{if } a_i=b_i=0 \qquad \text{then } a_i \oplus b_i=0$$

$$\left.\begin{array}{l}\text{if } a_i=1 \text{ and } b_i=0\\ \text{or } a_i=0 \text{ and } b_i=1\\ \text{or } a_i=b_i=i\end{array}\right\} \text{then } a_i \oplus b_i=1$$

for all values of *i*, i.e. for all the binary places of the words A and B.

A further type of storage may be used, namely, non-alterable storage. This type of storage is particularly useful for microprogrammes, which are described below.

Non-alterable storage locations may consist of one magnetic core only, all the output wires belonging to a binary place in which the digit is to be the digit "1" threading the core and none of the remainder of the output wires threading it. There are no write column wires for this type of storage location but the select wire concerned threads the core twice so that a current of $\frac{1}{2}I_s$ in the select wire will put the core into the "1" state ready for the read wire concerned to turn the core back to the "0" state, generating a voltage in all the output wires linking the core.

It is clearly also possible for a storage location to be partially alterable, i.e. to have some non-alterable digits and some alterable digits. A possible use for such a storage location is described below with reference to the second embodiment.

*Special locations*

Figure 2:
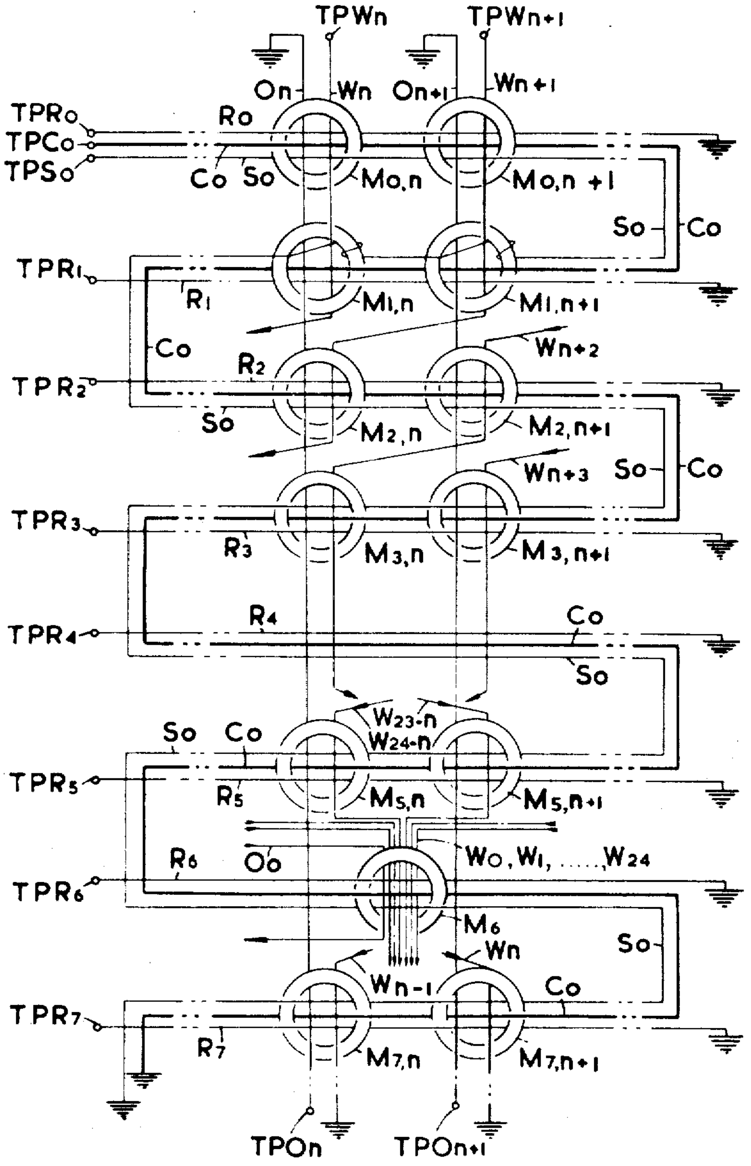
FIGURE 2 is a circuit diagram of another part of a magnetic core store.

FIGURE 2 is a circuit diagram of another part of a magnetic core store. A sub-matrix of magnetic cores has seven rows and the same 25 columns of the rest of the store, but some cores are shared between columns so that the full 175 cores are not used.

The function of this part of the store will first be explained briefly and then it will be described more fully with respect to FIGURE 2.

The part of the store concerned constitutes a block of special locations in the store, which in this embodiment are seven in number. The addresses of the locations are 0, 1, 2, 3, 5, 6 and 7. A number being written into the block of special locations is always written into the destination address 0. In other words the address 0 is the only one available as a destination. All the addresses, however, are available as source addresses but the word emerging from each source except the source 0 is a logical function of the word written into the destination 0. If the word written into the destination address 0 is X then the words available at the source addresses 0, 1, 2, 3, 5, 6 and 7 are given in the following Table 1.

TABLE 1

| Source | Word available |
|---|---|
| 0 | X, the word written into the destination 0. |
| 1 | $\overline{X}$, the logical complement of X. This is defined as the word having a digit 1 at every binary place where X has a digit 0 and a digit 0 at every binary place where X has a digit 1. |
| 2 | X shifted one binary place to the left. |
| 3 | X shifted two binary places to the left. |
| 5 | The word having the digits of X in the reverse order. |
| 6 | The logical sum of all the digits of X. |
| 7 | X shifted one binary place to the right. |

In the present embodiment the location 4 is not used but it may be used if desired for any convenient logical function of the word X written into the destination 0.

In FIGURE 2 there are shown thirteen cores from the *n*th and (*n* x *i*)th columns of the block of special locations. The sixth row consists of one core only. This core is labelled $M_6$. The cores are threaded with wires as shown in the following Table 2.

TABLE 2

| Core | Select Wire | Write Wire | Read Wire | Clear Wire | Output Wire |
|---|---|---|---|---|---|
| $M_{0,n}$ | $S_0$ | $W_n$ | $R_0$ | $C_0$ | $O_n$ |
| $M_{1,n}$ | $2S_0$ | $W^*_0$ | $R_1$ | $C_0$ | $O_n$ |
| $M_{2,n}$ | $S_0$ | $W_{n+1}$ | $R_2$ | $C_0$ | $O_n$ |
| $M_{3,n}$ | $S_0$ | $W_{n+2}$ | $R_3$ | $C_0$ | $O_n$ |
| $M_{5,n}$ | $S_0$ | $W_{24-n}$ | $R_5$ | $C_0$ | $O_n$ |
| $M_6$ | $S_0$ | $W_0$–$W_{24}$ | $R_6$ | $C_0$ | $O_0$ |
| $M_{7,n}$ | $S_0$ | $W_{n-1}$ | $R_7$ | $C_0$ | $O_n$ |
| $M_{0,n+1}$ | $S_0$ | $W_{n+1}$ | $R_0$ | $C_0$ | $O_{n+1}$ |
| $M_{1,n+1}$ | $2S_0$ | $W^*_{n+1}$ | $R_1$ | $C_0$ | $O_{n+1}$ |
| $M_{2,n+1}$ | $S_0$ | $W_{n+2}$ | $R_2$ | $C_0$ | $O_{n+1}$ |
| $M_{3,n+1}$ | $S_0$ | $W_{n+3}$ | $R_3$ | $C_0$ | $O_{n+1}$ |
| $M_{5,n+1}$ | $S_0$ | $W_{23-n}$ | $R_5$ | $C_0$ | $O_{n+1}$ |
| $M_{7,n+1}$ | $S_0$ | $W_n$ | $R_7$ | $C_0$ | $O_{n+1}$ |

In Table 2, if a wire threads a core in the opposite sense to that in which the corresponding wire threads the corresponding core in FIGURE 1, then the reference to that wire has an asterisk. The select wire $S_0$ threads the cores in row 1 of the sub-matrix twice and so, in Table 2, the select wire for the $M_{1,n}$ and the core $M_{1,n+1}$ is shown as $2S_0$.

Row 0 of the sub-matrix is wired in a similar way to any normal row of the store, except that it is also wired by the clear wire $C_0$, the function of which is described below. Thus if any word is written into the location 0 then the location 0 as a source will yield that number.

The select wire $S_0$ also threads row 1 of the sub-matrix, but, as indicated above, it threads each core in row 1 twice. The effect is that a current I in the select wire $S_0$ has the same effect on a core in row 1 that a current 2I in the select wire $S_0$ would have on a core in the row 0. Therefore the current $\frac{1}{2}I_s$ in the select wire $S_0$ is sufficient by itself to turn the cores in the row 1. However, the write wires $W_i$, $i=0, 1, 2, \ldots, 24$ thread the cores $M_{1,i}$ in such a direction that a current $\frac{1}{2}I_s$ in a write wire will prevent the core threaded by the write from being turned by the current $\frac{1}{2}I_s$ in the select wire. In other words, the cores corresponding to digits having a value of 0 are put into the 1-state and vice versa. The reading arrangements in the row 1 are the same as those of any normal row.

In row 2 the write wires for each magnetic core appertain to the digit place on the right. In other words, the write wire $W_i$ threads the core $M_{2,i-1}$ for $i=1, 2, \ldots,$ 24. There is no core $M_{2,24}$ and the wire $W_0$ does not thread any core in row 2. Thus a word written into the destination 0 is available from the source 2 shifted one place to the left, i.e. multiplied by 2.

In row 3 this shifting process is carried one stage further in exactly the same way so that there are no cores $M_{3,23}$ or $M_{3,24}$, and a word written into the destination 0 is available from the source 3 shifted two places to the left i.e. multiplied by 4.

Row 5 is a row which differs from row 0 only in that the core $M_{5,i}$ is threaded by the write wire $W_{24-i}$, $i=0, 1, \ldots, 24$. Thus a word written into the destination 0 is available from the source 5 with its digits reversed in order.

Row 6 consists of a single core $M_6$ threaded by all the write wires $W_i$, $i=0, 1, 2, \ldots, 24$ and by the single output wire $O_0$. When a word X has been written into the destination 0 and the source 6 is called for, the wire $O_0$ will carry no output only if $X=0$. This forms the basis of a useful test in a programme.

Row 7 provides a right shift of one place. Each core $M_{7,i}$ is threaded, with write wire $W_{i-1}$, $i=1, 2, 3, \ldots,$ 24 and there is no core $M_{7,0}$.

When the contents of any row are read out, all the cores in that row are turned to the 0-state, as is the case with any other location in the store. However, the special locations are not yet ready to receive a new word written into them until the remaining special locations are set to zero. This is done by means of the clear wire $C_0$ which is arranged to carry a current $I_s$ after the contents of a location are read out. This current in the clear wire turns all the cores in the special locations into the 0-state.

*Instruction word and control unit*

Instruction words in the present embodiment are, like number words, 25 digits long, and the digits have the following meanings:

Digits 0 and 1 ---------------------------Order type
Digits 2, 3 and 4 ------------Special Location Address
Digits 5–14 -----------------------Operand Address
Digits 15–24 ---------------Next Instruction Address Calculations are performed by transfers determined by instruction words. The transfers are always between a special address and an operand address and are of four types, called A, B, C and D, determined by the digits 0 and 1 in the manner shown in the following Table 3.

ABLE 3

| Type | Order Code | Order |
|---|---|---|
| A | 00 | Without clearing the operand address location put its contents into the special location. |
| B | 01 | Clearing the operand address location put its contents into the special location. |
| C | 10 | Clearing the entire special locations put the contents of the specified special location into the operand address location. |
| D | 11 | Without clearing the special location, test the specified special location for negative contents: if negative, take the next instruction from the operand address; if positive or zero, proceed normally. |

The manner in which these instructions are performed is described with reference to FIGURE 3, which is a block diagram of a digital computing engine.

Figure 3:
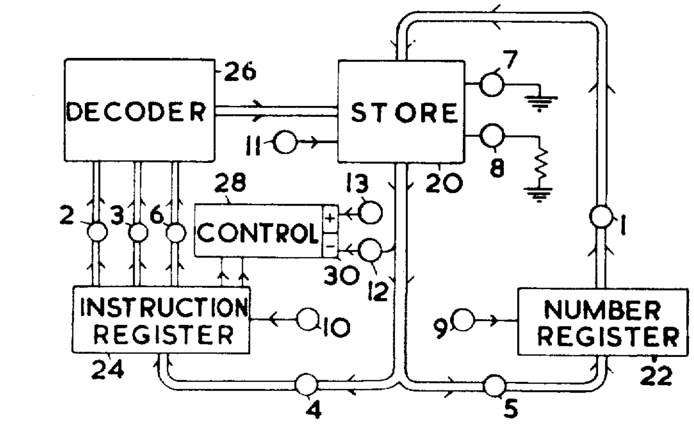
FIGURE 3 is a block diagram of an electrical digital computing engine.

In FIGURE 3 the store is labelled 20 and connected to a number register 22, an instruction register 24, a decoder 26 and a control unit 28. The interconnections between these units are made via thirteen units, 1, 2, 3, 4, 5, 6, 7, 8, 9, 10, 11, 12 and 13. The thirteen units are all single or multiple gates and for convenience will be referred to as "gates" simply. They are arranged as follows.

The parallel output of the number register 22 is fed into the store 20 via the gate 1. The parallel outputs of the next instruction source address and operand address parts of the instruction register 24 are applied to the decoder 26 via the gate 2 and the gate 3 respectively. The parallel output of the store 20 is applied to the instruction register 24 and the number register 22 via the gate 4 and the gate 5 respectively. The parallel output of the special location address part of the instruction register 24 is applied to the decoder 26 via the gate 6. The read and select windings of the store 20 are under the control of the gates 7 and 8 respectively. The number register 22, the instruction register 24 and the special locations of the store 20 are cleared by outputs from the gate 9, the gate 10 and the gate 11 respectively. The control unit 28 contains a bistable circuit 30 called the sign bistable 30 which is set by the sign digit emerging from the store 20 when the gate 12 is open and is cleared by the output from the gate 13.

The parallel output of the decoder 26 is directly applied to the store 20 and the output of the order code digits of the instruction register 24 is directly applied to the control unit 28. Both the number regiser 22 and the instruction register 24 consist of 25 bistable circuits, one for each digit position of a word. The gates, 1, 2, 3, 4, 5, 6, 7, 8, 9, 10, 11, 12 and 13 are connected to and controlled under the operation of the control unit 28 by connections which are not shown for the sake of clarity.

The operation of the computing engine is timed in bars of nine beats each. A transfer takes one bar to accomplish. At the beginning of a bar an instruction to be obeyed is already in the instruction register 24, and as described below, it is arranged that at the end of the bar the next instruction is in the instruction register ready for the next transfer. The type of transfer to be performed depends upon the order code digits in the instruction word, which are sent to the control unit 28. The operation will be herein dealt with separately for each type of order code. It is to be noted that in order to simplify the logical arrangement of the control unit some gates are opened when it is not strictly necessary that they should be: for example in the first beat of every bar the gate 12 is opened although this is unnecessary except for an order of type D.

*A. Without clearing the operand address location put its contents into the special location*

*Beat 1.*—The gates 3, 5, 7 and 12 are opened. By this means the operand address is selected in the store 20 (the gate 3 allowing the operand address number to be applied to the decoder 26 where it is decoded and used to energise the relevant select wire of the store 20), the operand is read out (by the read gate 7 being opened) and placed in the number register 22 (via the gate 5). Meanwhile the sign digit of the operand is set on the sign bistable 30 (via the gate 12).

*Beat 2.*—The gates 1, 3 and 8 are opened. By this means the operand, which had been cleared from its address by the reading process, is put back into its address (selected via the gate 3) in the store 20 (via the gate 1) by virtue of the select gate 8 being open.

*Beat 3.*—The gates 1, 6 and 8 are opened. By this means the operand is written into the special location address, the gate 6 allowing the correct special location address to be selected.

*Beat 4.*—The transfer having taken place, the gate 9 emits a pulse, clearing the number register 22.

*Beat 5.*—The gates 2, 5 and 7 are opened, allowing the next instruction word to be set up on the number register 22.

*Beat 6.*—The gates 1, 2 and 8 are opened, allowing the next instruction word to be rewritten into its address in the store 20.

*Beat 7.*—The current instruction word in the instruction register being no longer required, the gates 10 and 13 emit pulses to clear the instruction register 24 and the sign bistable 30.

*Beat 8.*—The gates 1 and 4 are opened, allowing the next instruction word to flow from the number register, through the write wires. $W_0$, $W_1$ . . . $W_{24}$ (of FIGURE 1 and FIGURE 2) to the instruction register 24 via the gates 1 and 4. Thus the next instruction is set up in readiness for the new transfer.

*Beat 9.*—The gate 9 emits a pulse to clear the number register 22.

*B. Clearing the operand address location put its contents into the special location*

The sequence of events for this order is the same as that for an order of type A except that in beat 2 no gate is energised, so that the operand is not written into the store.

*C. Clearing the entire special locations, put the contents of the specified special location into the operand address location*

*Beat 1.*—The gates 5, 6, 7 and 12 are opened, so that the specified special location is selected (via the gate 6) and the contents read (because of the gate 7) into the number register 22 (via the gate 5). Meanwhile the sign digit of the contents is set on the sign bistable 30.

*Beat 2.*—The gate 11 emits a pulse, clearing the entire special locations.

*Beat 3.*—The gates 1, 3 and 8 are opened, so that the operand in the number register 22 is written (because of the gate 8) into the location of the store selected by the gate 3 (via the gate 1).

*Beats 4 to 9.*—The gates opened and the operation of the computing engine during beats 4 to 9 for an order of type C are the same as those for an order of type A and an order of type B.

*D. Without clearing the special location, test the specified special location for negative contents: if negative, take the next instruction from the operand address; if positive or zero, proceed normally.*

*Beat 1.*—The gates 5, 6, 7 and 12 are opened, so that the specified special location is selected (via the gate 6) and the sign digit of the contents is set on the sign bistable 30. The gate 5 is opened merely to simplify the logical arrangement of the engine.

*Beat 2.*—No gate is energized.

*Beat 3.*—The gates 1 and 8 are opened. This is merely to simplify the logical arrangement of the engine.

*Beat 4.*—The gate 9 is opened, clearing the number register.

*Beat 5 and Beat 6.*—The gates energised during beats 5 and 6 depend upon the setting of the sign bistable, as follows.

| | Sign bistable set (operand $< 0$) | Sign bistable not set (operand $\geq 0$) |
|---|---|---|
| Beat 5 | The gates 3, 5 and 7 are opened, causing the word stored in the operand address to be written into the number register. | The gates 2, 5 and 7 are opened, causing the word stored in the next instruction address to be written into the number register. |
| Beat 6 | The gates 1, 3 and 8 are opened, causing the word in the number register to be re-written into the store. | The gates 1, 2 and 8 are opened, causing the word in the number register to be re-written into the store. |

*Beats 7 to 9.*—The gates opened and the operation of the computing engine during beats 7 and 9 for an order of type D are the same as those for orders of types A, B and C. In particular, the instruction set up in readiness for the new transfer is that taken from the operand address or the next instruction source according as the word in the specified special location is negative or not.

It will be noted that the specified special location is cleared in the process of performing the order D and therefore is not available for further transfers, although the special locations not specified are so available later.

Those skilled in the art will be aware that it is convenient at times to test not only whether a number is negative but whether it is zero. This test may be carried out by using the address 6 in the special locations. If a number is zero then the core $M_6$ in FIGURE 2 will remain in the 0-state but if the number is non-zero it will have a non-zero digit, so that the core $M_6$ will be turned into the 1-state by the writing action. The execution of an order of type D with a specified special location address of 6 will cause the core $M_6$ to be turned back into the 0-state, giving an output on the sign digit output line $O_0$ setting the sign bistable 30. The process continues as described above with the result that the new instruction is taken from the operand address or the next instruction address according as the word in the special locations is non-zero or zero.

*Arithmetical operations*

Two examples of arithmetical operations, namely addition and subtraction, will be described. These two operations being basic to the whole of arithmetic, a computing engine which can perform them can perform any arithmetical calculation provided it has sufficient storage space and is given sufficient time.

As explained above, the only logical operations directly available in the computing engine are the formation of the logical sum $A \oplus B$ of two operands A and B, the formation of the logical complement $\bar{A}$ of an operand A, shifting the digits of an operand one or more places to the left or right, reversing the order of the digits of an operand and forming the logical sum of all the digits of an operand. Other logical operations are, of course, possible to obtain by combinations of these operations, and in particular the formation of the logical product (or "and" function) A.B of two operands A and B, in manners explained below.

The logical product A.B of two words A and B is defined as the word having a digit $a_i.b_i$ as its $i$th binary digit, where $a_i$ and $b_i$ are the $i$th binary digits of A and B respectively and $a_i.b_i$ is given by $$\left.\begin{array}{l}\text{if } a_i=b_i=0\\ \text{or } a_i=1 \text{ and } b_i=0\\ \text{or } a_i=0 \text{ and } b_i=1\end{array}\right\}\text{Then } a_i \cdot b_i=0$$

$$\text{if } a_i=b_i=1 \qquad \text{then } a_i \cdot b_i=1$$

for all values of $i$, i.e., for all the binary places of the words A and B.

*Addition of two numbers X and Y.*—This is achieved by replacing the number X with the number $\overline{X}.Y\oplus X.\overline{Y}$ and replacing the number Y with the number X.Y shifted one place to the left. This process is repeated until the location which originally contained the number Y contains the number zero, when the location which originally contained the number X contains the number $X+Y$. The reason for this can be seen by reference to the following Table 4 in which $x$ is taken to be a digit of X and $y$ a corresponding digit of Y.

TABLE 4

| $x$ | $y$ | $\bar{x}$ | $\bar{y}$ | $\bar{x}.y$ | $x.\bar{y}$ | $\bar{x}.y\oplus x.\bar{y}$ | $x.y$ | $y+y$ |
|---|---|---|---|---|---|---|---|---|
| 0 | 0 | 1 | 1 | 0 | 0 | 0 | 0 | 00 |
| 1 | 0 | 0 | 1 | 0 | 1 | 1 | 0 | 01 |
| 0 | 1 | 1 | 0 | 1 | 0 | 1 | 0 | 01 |
| 1 | 1 | 0 | 0 | 0 | 0 | 0 | 1 | 10 |

It will be seen that if $x+y$ is regarded as a two-digit number, of which the more significant digit is the carry digit and the less significant digit is the sum digit then $x.y$ is the same as the carry digit and $\bar{x}.y\oplus x.\bar{y}$ is the same as the sum digit. Therefore for two numbers X and Y, $\overline{X}.Y\oplus X.\overline{Y}$ is the sum term, and X.Y is the carry term which has to be shifted to the left to make it of the correct significance. The shifted carry term is added to the sum term and the process repeated until the carry term is zero.

By Boolean algebra the terms $\overline{X}.Y\oplus X.\overline{Y}$ and X.Y can be generated using only the logical sum and complementing functions, as follows:

$$X.Y=\overline{\overline{X}\oplus\overline{Y}}$$
$$\overline{X}.Y\oplus X.\overline{Y}=\overline{X.Y\oplus\overline{X\oplus Y}}$$

where X.Y is generated as above.

The following example of addition assumes that the augend X and the addend Y are stored in location 8 and location 9 respectively. The transfers are set out in the following Table 5. (In the 'Notes' column of Table 5 the abbreviation "L*n*" will be used for "location *n*" for shortness.)

It is convenient for all the instruction words concerned to be permanently available in a block in the store. This saves the insertion of sixteen instructions for every addition operation in a programme. Such a block is known as a microprogramme.

*Subtraction of two numbers X and Y.*—This is achieved similarly by replacing the number X with the number $\overline{X}.Y\oplus X.\overline{Y}$ (the difference term) and replacing the number Y with the number $\overline{X}.Y$ shifted one place to the left (the borrow term). This process is repeated until the location which originally contained the number Y contains the number zero, when the location which originally contained the number X contains the number X−Y.

The difference and borrow terms are generated as follows:

$$\overline{X}.Y\oplus X.\overline{Y}=\overline{X\oplus\overline{Y}}\oplus\overline{\overline{X}\oplus Y}$$
$$\overline{X}.Y=\overline{X\oplus\overline{Y}}$$

TABLE 5

| Order Type | Source address | Word stored in source | Destination address | Word stored in destination | Notes |
|---|---|---|---|---|---|
| A | 8 | X | 0 | X | |
| C | 1 | $\overline{X}$ | 10 | $\overline{X}$ | L1 now contains $\overline{X}$. |
| A | 9 | Y | 0 | Y | |
| C | 1 | $\overline{Y}$ | 10 | $\overline{X}\oplus\overline{Y}$ | |
| B | 10 | $\overline{X}\oplus\overline{Y}$ | 0 | $\overline{X}\oplus\overline{Y}$ | L10 already contains $\overline{X}$; |
| C | 1 | $\overline{\overline{X}\oplus\overline{Y}}$(=X.Y) | 10 | X.Y | Clearing L10. |
| B | 9 | Y | 0 | Y | Carry term formed. |
| C | 0 | Y | 8 | X⊕Y | Clearing L9. |
| A | 10 | X.Y | 0 | X.Y | L8 already contains X; |
| D | 6 | | | | Test for X.Y=0; |
| | | If X.Y=0, next instruction is | | | |
| C | 0 | X.Y | 1023 | | L1023 is a location used merely for clearing the special locations into; |
| | | and the location 8 contains the sum X+Y | | | |
| | | If X.Y≠0, next instruction is | | | |
| C | 2 | (X.Y)$l$ | 9 | (X.Y)$l$ | (X.Y)$l$=X.Y left shift; carry term put into L9. |
| B | 8 | X⊕Y | 0 | X⊕Y | |
| C | 1 | $\overline{X\oplus Y}$ | 8 | $\overline{X\oplus Y}$ | |
| B | 8 | $\overline{X\oplus Y}$ | 0 | $\overline{X\oplus Y}$ | |
| B | 10 | X.Y | 0 | $X.Y\oplus\overline{X\oplus Y}$ | |
| C | 1 | $\overline{X.Y\oplus\overline{X\oplus Y}}$ (=$\overline{X}.Y\oplus X.\overline{Y}$) | 8 | $\overline{X}.Y\oplus X.\overline{Y}$ | Sum term formed and put into L8. |
| | | The process repeats from the beginning until at some stage X.Y=0 | | | |

The following example of subtraction assumes that the minuend X and the subtrahend Y are stored in location 12 and location 13 respectively. The transfers set out in the following Table 6. (The same abbreviations are used in Table 6 as in Table 5.)

TABLE 6

| Order Type | Source address | Word stored in source | Destination address | Word stored in destination | Notes |
|---|---|---|---|---|---|
| A | 12 | $X$ | 0 | $X$ | |
| C | 1 | $\bar{X}$ | 10 | $\bar{X}$ | |
| A | 13 | $Y$ | 0 | $Y$ | |
| C | 1 | $\bar{Y}$ | 11 | $\bar{Y}$ | |
| B | 11 | $\bar{Y}$ | 0 | $\bar{Y}$ | |
| B | 12 | $X$ | 0 | $X \oplus \bar{Y}$ | |
| C | 1 | $\overline{X \oplus \bar{Y}}(=\bar{X}.Y)$ | 11 | $\bar{X}.Y$ | Borrow term formed. |
| B | 10 | $\bar{X}$ | 0 | $\bar{X}$ | |
| B | 13 | $Y$ | 0 | $\bar{X} \oplus Y$ | |
| C | 1 | $\overline{\bar{X} \oplus X}(=X.\bar{Y})$ | 12 | $X.\bar{Y}$ | |
| A | 11 | $\bar{X}.Y$ | 0 | $\bar{X}.Y$ | |
| D | 6 | | | | Test for $\bar{X}.Y=0$. |
| | If $\bar{X}.Y=0$, next instruction is | | | | |
| C | 0 | $\bar{X}.Y$ | 1023 | | Clear special locations. |
| | and the location 12 contains the difference $X-Y$. | | | | |
| | If $X.Y \pm 0$, next instruction is | | | | |
| C | 2 | $(\bar{X}.Y)l$ | 13 | $(\bar{X}.Y)l$ | Borrow term put into L13. |
| B | 11 | $\bar{X}.Y$ | 0 | $\bar{X}.Y \oplus X.\bar{Y}$ | Difference term formed. |
| C | 0 | $\bar{X}.Y \oplus X.\bar{Y}$ | 12 | $\bar{X}.Y \oplus X.\bar{Y}$ | Difference term put into L12. |
| | The process repeats from the beginning until at some state $\bar{X}.Y=0$ | | | | |

Again it is convenient for all the instruction words concerned to be permanently available in a microprogramme.

*Alternative embodiment*

An alternative embodiment will now be described. In the alternative embodiment three of the four types of order, viz., the types A, B and C are the same as in the original embodiment but the fourth type, the type D, is different. The type D is now as follows:

If the content of the operand address is negative take the next instruction from the address formed by the three digits in the special location part of the instruction word and the seven most significant digits of the next instruction address, as its three least and seven most significant digits respectively; if the content is positive or zero take the next instruction in the normal manner. The operand address is cleared.

For example if the instruction word were 11 *cde fghijklmno pqrstuvwxy*, the order type being 11, the special location address being *cde*, the operand address being *fghijklmno* and the next instruction address being *pqrstuvwxy*, then the instruction would be obeyed as follows. The number stored in the address *fghijklmno* is extracted, clearing the address, and examined as to whether it is negative or no. If the number is positive or zero then the next instruction is taken from the source *pqrstuvwxy*; if it is negative, the next instruction is taken from the source *pqrstuvcde*.

The manner in which this type of order is performed will be described with reference to FIGURE 4, which is a block diagram of part of an electrical digital computing engine, and to FIGURE 3, which is described above.

Figure 4:
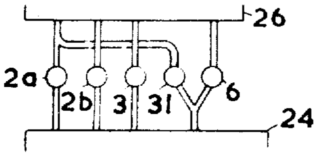
FIGURE 4 is a block diagram of part of an alternative electrical digital computing engine.

The overall design of the engine in the alternative embodiment is much the same as that of the engine in the original embodiment and FIGURE 4 shows the main differences. The gate 2 (of FIGURE 3) allowing the next instruction address part of the word set up on the instruction register to be applied to the decoder 26 is replaced by two gates, a gate 2*a* and a gate 2*b*. The gate 2*a* controls the three least significant digits of the next instruction address and the gate 2*b* controls the seven most significant digits of the next instruction address. A further gate 31 allows the special location address part of the word set upon the instruction register to be applied to the decoder 26 in the place of the three least significant digits of the next instruction address, it being arranged that the gate 2*a* and the gate 31 are never open at the same time.

The operation of the computing engine for orders of types A, B and C are as described above with reference to FIGURE 3 with the single exception that references to the gate 2 being opened in the above description should be replaced by references to the gate 2*a* and the gate 2*b* being opened simultaneously. The operation of the computing engine for an order of the new type D is as follows.

*Beat 1*.—The gates 3, 5, 7 and 12 are opened, so that the specified operand address is selected (via the gate 3) and the sign digit of the contents is set on the sign bistable 30. The gate 5 is opened merely to simplify the logical arrangement of the engine.

*Beat 2*.—No gate is energized.

*Beat 3*.—The gates 1 and 8 are opened. This is merely to simplify the logical arrangement of the engine.

*Beat 4*.—The gate 9 is opened, clearing the number register.

*Beat 5 and Beat 6*.—The gates energised during beats 5 and 6 depend upon the setting of the sign bistable, as follows.

| | Sign bistable set (operand <0) | Sign bistable not set (operand ≥0) |
|---|---|---|
| Beat 5 | The gates 2*b*, 5, 7 and 31 are opened, causing the word stored in the address formed by the most significant seven digits of the next instruction address and the three digits specifying the special location to be written into the number register. | The gates 2*a*, 2*b*, 5 and 7 are opened, causing the word stored in the next instruction address to be written into the number register. |
| Beat 6 | The gates 1, 2*b*, 8 and 31 are opened, causing the word in the number register to be rewritten into the store. | The gates 1, 2*a*, 2*b* and 8 are opened, causing the word in the number register to be rewritten into the store. |

*Beats 7 to 9.*—The gates opened and the operation of the computing engine during beats 7 to 9 for an order of type D are the same as those for orders of types A, B and C. In particular, the instruction set up in readiness for the new transfer is that taken from the composite address described or the next instruction address according as the operand is negative or not.

*Special locations*

In the alternative embodiment there are eight special locations in the store. The location 0 is available as a destination only but the remainder of the locations are available as sources or destinations. The locations 2 and 3 provide shifts of binary places to the left or right. The locations 1, 4, 5, 6 and 7 are equivalent to ordinary locations in the main part of the store except that they are available as destinations in orders of the type A or B and sources in orders of the type C as well as destinations in orders of the type A or B. The following Table 7 shows the word available from each special location as a logical function of the words written into the special locations.

TABLE 7

| Location | Word written in | Word available |
|---|---|---|
| 0 | X | |
| 1 | M | M |
| 2 | N | N shifted one binary place to the right. |
| 3 | P | P shifted one binary place to the left. |
| 4 | R | R |
| 5 | S | S |
| 6 | T | T |
| 7 | U | U |

The location 0 is used for clearing any other location in the store by means of the appropriate B order. In practice there are no cores or row wires associated with the location 0. It is equivalent to the location 1023 in Table 5 above.

*Microprogrammes*

In the alternative embodiment, each microprogramme with an instruction of the form $$K=B, 0, K+N, K+1$$

i.e. an instruction in the location K of type B having special location, operand and next instruction addresses 0, $K+N$ and $K+1$ respectively, where $K+N$ is the location of the last instruction in the microprogramme. In order to arrive at the instruction in the location K the instruction immediately preceding it is in the form $$H: A, 1, J, K$$

where J is the location of the instruction that precedes the instruction in the location H; it is also necessary for H to be an even number and for $H+1$ to be the address of the instruction that immediately follows the instruction in the location $K+N$.

By the instruction of the location H, the number in the location J is put into the special location 1. By the first instruction of the microprogramme, $$K: B, 0, K+N, K+1$$

the alterable digits of the last instruction of the microprogramme are cleared. These alterable digits consist of the nine most significant digits of the next instruction address. The least significant digit of the next instruction address is arranged to be 1, non-alterable by means of the wiring of the address $K+N$.

The second instruction of the microprogramme is in the form $$K+1: C, 1, K+N, K+2$$

by which the appropriate digits of the contents of the location 1 (i.e. the instruction word that preceded the instruction in the location H) are written into the location $K+N$. In other words, the last instruction in the microprogramme (i.e., the instruction in the location $K+N$) now has as the nine most significant digits of its next instruction address the nine most significant digits of the number H (since the next instruction address of the instruction in the location J is H). But H is arranged to be even, so that its least significant digit is 0, and the least significant digit of the next instruction address of the instruction word in the location $K+N$ is arranged to be 1 (non-alterable) by means of the wiring of the address $K+N$. Therefore the new next instruction address of the instruction in the location $K+N$ is $H+1$, which is what is required.

*Supplementary special locations*

Further locations 8 to 13 inclusive are not ordinary locations and can be regarded as additional special storage locations and will be referred to herein as supplementary special locations. Because, in this embodiment there are only eight special location addresses, these supplementary special locations are addressed as operands.

The following Table 8 shows the word available from each supplementary special location as a logical function of words written into the supplementary special locations.

TABLE 8

| Location | Word written in | Word available |
|---|---|---|
| 8 | A | $A.\bar{B} \oplus \bar{A}.B$. |
| 9 | B | A.B. left shift. |
| 10 | | A.B. zero test. |
| 11 | C | $C.\bar{D}. \oplus \bar{C}.D$. |
| 12 | D | $\bar{C}$.D. left shift. |
| 13 | | $\bar{C}$.D. zero test. |

Other supplementary special locations may, of course, be provided for other logical functions, for example, the functions set out in Table 1 above.

The reason for the supplementary special locations set out in Table 8 is to provide for quicker addition (locations 8, 9 and 10) and subtraction (locations 11, 12 and 13) since in these locations the sum and carry terms for addition and the difference and borrow terms for subtraction are formed directly.

Figure 5:
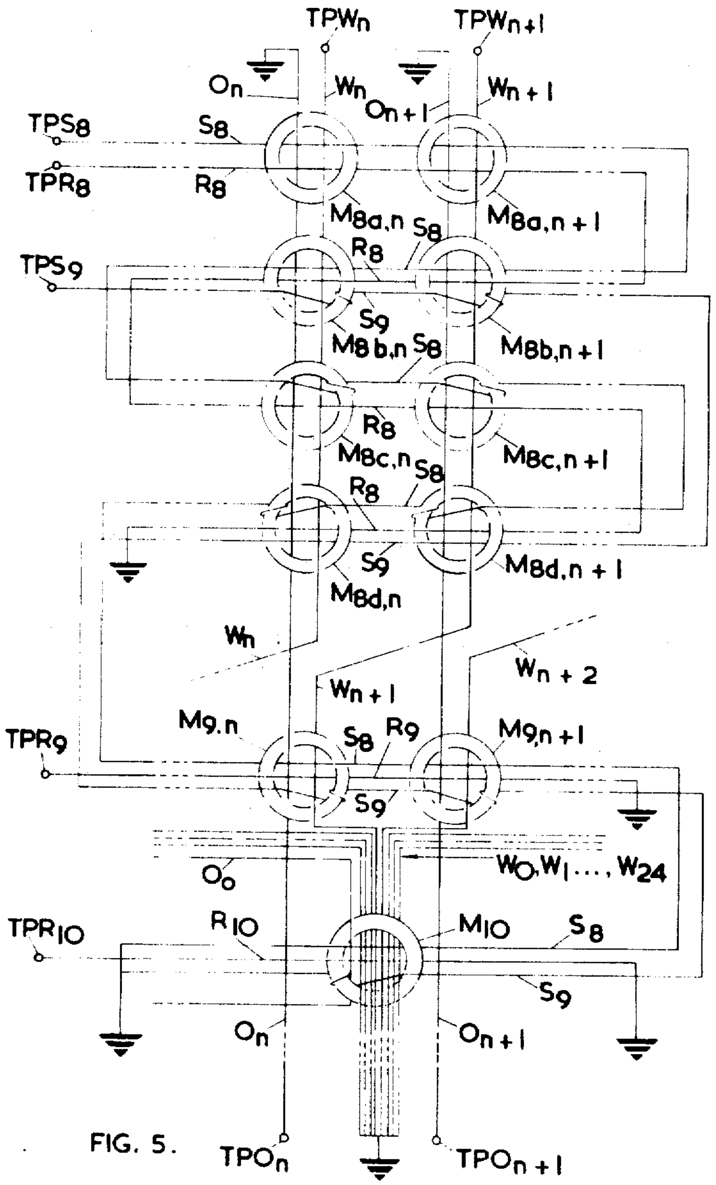
FIGURE 5 is a circuit diagram of part of an alternative magnetic core store.

FIGURE 5 is a circuit diagram of part of a block of supplementary special locations, namely, the locations 8, 9 and 10. Eleven cores from the $n$th and $(n+1)$th columns of the supplementary locations are shown. The location 10 has a single core $M_{10}$ similar to the core $M_6$ of FIGURE 2. The cores are threaded with wires as shown in the following Table 9.

TABLE 9

| Core | Select Wire | Write Wire | Read Wire | Output Wire |
|---|---|---|---|---|
| $M_{8a,n}$ | $S_8$ | $W_n$ | $R_8$ | $O_n^*$ |
| $M_{8b,n}$ | $S_8, 2S_9^*$ | $W_n$ | $R_8$ | $O_n$ |
| $M_{8c,n}$ | $2S_8^*$ | $W_n$ | $R_8^*$ | $O_n$ |
| $M_{8d,n}$ | $2S_8^*, S_9$ | $W_n$ | $R_8^*$ | $O_n^*$ |
| $M_{9,n}$ | $S_8, 2S_9^*$ | $W_{n+1}$ | $R_9$ | $O_n^*$ |
| $M_{10}$ | $S_8, 2S_9^*$ | $W_0-W_{24}$ | $R_{10}$ | $O_0^*$ |
| $M_{8a,n+1}$ | $S_8$ | $W_{n+1}$ | $R_8$ | $O_n^*{}_{+1}$ |
| $M_{8b,n+1}$ | $S_8, 2S_9^*$ | $W_{n+1}$ | $R_8$ | $O_{n+1}$ |
| $M_{8c,n+1}$ | $2S_8^*$ | $W_{n+1}$ | $R_8^*$ | $O_{n+1}$ |
| $M_{8d,n+1}$ | $2S_8, S_9$ | $W_{n+1}$ | $R_8^*$ | $O_n^*{}_{+1}$ |
| $M_{9,n+1}$ | $S_8, 2S_9^*$ | $W_{n+2}$ | $R_9$ | $O_n^*{}_{+1}$ |

The same conventions are used in Table 9 as in Table 2.

The action of the circuit is as follows. The currents made to flow in the various wires at various times are of the same magnitudes and in the same directions and flow at the same times as the corresponding currents described with reference to FIGURE 1. It is necessary that the word A be written into the location 8 before the word B be written into the location 9. What happens to the cores in the *n*th column when the words A and B are written into the locations 8 and 9 respectively will be described; cores in the other columns respond in an analogous way.

The cores $M_{8a,i}$, $M_{8b,i}$, $M_{8c,i}$ and $M_{8d,i}$, i=0,1, . . . , 24, are used to generate the exclusive OR function, $A.\bar{B}\oplus\bar{A}.B$, in the following manner.

In the case where the *n*th digit of A=the *n*th digit of B=1, the act of writing the word A into location 8 sets the cores $M_{8a,n}$ and $M_{8b,n}$ but leaves the cores $M_{8c,n}$ and $M_{8d,n}$ reset, since the flux in these cores generated by the current in the wire $S_8$ opposes that generated by the current in the wire $W_n$. The act of wiring the word B into location 9 will not affect any of the cores for the following reasons. The wire $S_9$ does not thread the core $M_{8a,n}$ or the core $M_{8c,n}$ and so these cores are not affected. The core $M_{8b,n}$ is not affected because the flux in this core generated by the current in the wire $S_9$ is opposed by the flux generated by the current in the wire $W_n$. The flux generated in the core $M_{8d,n}$ by the currents in the wires $S_9$ and $W_n$ is in such a direction as to reset the core. However the core is already reset, and so is unaffected.

When a current is caused to flow in the readout wire $R_8$ the cores $M_{8a,n}$ and $M_{8b,n}$ are reset. However, the voltages thereby generated in the readout wire $O_n$ are in opposition, so that no current flows in the wire $O_n$.

In the case where the *n*th digit of A=1 and the *n*th digit of B=O, the act of writing the word A into location 8 sets the cores $M_{8a,n}$ and $M_{8n,b}$, leaving the cores $M_{8c,n}$ and $M_{8d,n}$ reset as before. The act of writing the word B into location 9 will reset the core $M_{8b,n}$, since the wire $S_9$ threads the core $M_{8b,n}$ twice and the current in the wire $S_9$ is the only flux-producing agent in the core $M_{8b,n}$. The cores $M_{8a,n}$ and $M_{8c,n}$ are of course unaffected, and the core $M_{8d,n}$ is unaffected since the wire $S_9$ only threads it once.

When a current is caused to flow in the readout wire $R_8$ the core $M_{8a,n}$ is reset, producing an output current in the output wire $O_n$.

In the case where the *n*th digit of A=O and the *n*th digit of B=1, the act of writing the word A into location 8 sets the cores $M_{8c,n}$ and $M_{8d,n}$ (since the wire $S_8$ threads these two cores twice and there is no other flux-producing agent for the cores) but leaves the cores $M_{8a,n}$ and $M_{8b,n}$ reset (since the wire $S_8$ threads each of these cores once only). The act of writing the word B into location 9 will reset the core $M_{8d,n}$, leaving the other cores unaffected (as explained above for the *n*th digit of B=1).

When a current is caused to flow in the readout wire $R_8$ the core $M_{8c,n}$ is reset, producing an output current in the output wire $O_n$.

In the case where the *n*th digit of A=the *n*th digit of B=O, the act of writing the word A into location 8 sets the cores $M_{8c,n}$ and $M_{8d,n}$, leaving the cores $M_{8a,n}$ and $M_{8b,n}$ reset. The act of writing the word B into location 9 would reset the core $M_{8b,n}$ if it were not already reset and does not affect the other cores; in other words the word B has no effect on these cores.

When a current is caused to flow in the readout wire $R_8$ the cores $M_{8c,n}$ and $M_{8d,n}$ are reset, but the voltages thereby generated in the readout wire $O_n$ are in opposition so that no current flows in the wire $O_n$.

It will be noticed that in fact the cores $M_{8a,n}$ and $M_{8b,n}$ generate the function $A.\bar{B}$. and the cores $M_{8c,n}$ and $M_{8d,n}$ generate the function $\bar{A}.B$, so that all together the cores generate the function $A.\bar{B}\oplus\bar{A}.B$, which is the exclusive OR function described above.

The cores $M_{9,i}$, i=0,1, . . . , 24, are used to generate the AND function A.B. in the following manner. The act of writing the word A into location 8 sets the core $M_{9,n}$ if the *n*th digit of the word A is 1 and fails to set it if the digit is 0. The act of writing the word B into location 9 will reset the core (if the core is set) if the *n*th digit of the word B is 0 but not otherwise, because the wire $S_9$ threads the core $M_{9,n}$ twice. Thus the core $M_{9,n}$ will remain set only if the *n*th digit of A=the *n*th digit of B=1.

The core $M_{10}$ is similar to the core $M_6$ in FIGURE 2, providing a zero test, but provides a zero test on the logical function A.B by virtue of the arrangement of the select wires $S_8$ and $S_9$, which thread the core $M_{10}$ in the manner as that in which they thread the cores as $M_{9,n}$.

The locations 11, 12 and 13 are constructed in an exactly analogous way. The logical functions to be generated have been described with reference to FIGURE 5: the exclusive OR function $C.\bar{D}.\oplus\bar{C}.D$. with reference to the cores $M_{8a,n}$, $M_{8b,n}$, $M_{8c,n}$ and $M_{8d,n}$ and the function $\bar{C}.D$. with reference to the cores $M_{8c,n}$ and $M_{8d,n}$.

With the supplementary special locations described the processes of addition and subtraction are far quicker then in the first embodiment hereinbefore described, the number of instructions in a loop being reduced from the 16 of the first embodiment to 4.

The instructions are as follows. First it will be assumed that the augend A and addend B are in locations 4 and 5 respectively.

(1) Insert A into location 8.

(2) Insert B into location 9.

(3) Test location 10 (=A.B) for zero. If non-zero, go to instruction 4 and if zero go to instruction 4*a*.

(4) Extract new value of addend from location 9 and insert it into location 5.

(5) Extract new value of augend from location 8 and insert it into location 0, without clearing location 8. By the mechanism described above this entails reading out the contents of location 8 and writing them back in location 8 (in the one instruction), whereby the new value of the augend has been inserted into the adder.

Instruction 2 is then obeyed for the new addend, and so on. When location 10 shows zero in the test instruction 3 the addition is complete and the only instruction to be obeyed is:

(4*a*) Extract the sum from location 8 and insert it into location 4.

By this programme the actual loop is only four instructions long. A similar programme is followed for subtraction.

*Alternative logical organisation computing engine*

In order to simplify the programming of a computing engine using microprogrammes in conjunction with special locations and also to reduce the number of digits in a word, the following type of instruction word may be used.

| | |
|---|---|
| Digits 0, 1 and 2 | Order type |
| Digits 3–9 | Special Location Address |
| Digits 10–19 | Operand Address |

In this case, the computing engine has an address counter which specifies the instruction address and in this respect the computing engine is similar to a single address machine which takes instruction addresses serially from an address counter. In addition, there is provided an operand register for temporarily storing the content of an operand address and also an entry address register for temporarily storing the content of the address counter whilst a microprogramme is being carried out.

From the type of instruction word given above, it will be seen that there can be 128 special addresses and 1024 operand addresses. The special location addresses are included within the number of operand address and can be addressed as operand addresses as well as special location addresses. The majority of the special location addresses are simple addresses from which words are read out in the same form as they are written into the location. These special locations may be used to store at least the commencement instructions of microprogrammes. However, some of the special locations are of the form described with reference to FIGURE 2 or FIGURE 5 or both, and these locations are used for performing logical functions on words.

The order code used in the instruction word consists of eight separate orders A to H, which are given in the following list:

A. Without clearing the operand address location, put its content into the special location.

B. Clearing the operand address location, puts its content into the special location.

C. Clearing the special location, put the content of the special location into the operand address location.

D. Without clearing the special location, test the specified special location for negative content; if negative, take the next instruction from the operand address, if positive or zero proceed normally.

E. Clearing the special location, test the specified special location for negative content; if negative take the next instruction from the operand address location; if positive or zero proceed normally.

F. Without clearing the special location, take the next instruction from the operand address location.

G. Clearing the operand address location, put the content of the operand address location into the operand register and put the content of the address counter into the entry address register; then take the next instruction from the specified special location.

H. Clearing the special location, put the content of the special location into the operand address location; then take the next instruction from the content of the entry address register incremented by unity.

Of the above orders, A to D are similar to those given in Table 3. Orders E and F are two additional jump instructions. Order G is used when proceeding from a main part of a programme into a microprogramme and order H is used at the end of a microprogramme to return the sequence of events to the control of the main part of a programme. A number of microprogrammes, for example those for addition and subtraction, may be set up using inustructions stored in a succession of addresses for each microprogramme so that all that has to be done to implement an instruction, such as add A to B, is to direct the machine programme into a corresponding microprogramme by using the order G. At the end of the microprogramme, the order H directs the machine programme back into the main programme. By this means, once microprogrammes have been set up in the store with the first instruction thereof in a special location, a programmer can operate the computing engine in much the same way as a simple single address machine. To the programmer the instruction word can then appear to be in the following form:

| | |
|---|---|
| Digits 0 to 9 | Order type |
| Digits 10 to 19 | Operand address |

In order to simplify programme terminology one of the special locations, say the special location 900, may be termed the accumulator. Furthermore, the special location 1023 may be similar to the special location 0 in Table 7 for clearing any other location in the store.

The following sequence of instructions illustrates part of a programme for this form of engine.

(1) *Programme Instruction.*—Put content of the operand address into the accumulator leaving the operand address clear. For this the instruction address may be 200 on the address counter, the order B, the special location 900 and the operand address 500.

(2) *Programme Instruction (201).*—Take the next instruction from the operand address. For this the instruction address is 201 on the address counter, the order F, the special location 1023 and the operand address 501.

(3) *Programme Instruction (501).*—Non-destructively test the sign of the content of the accumulator; if negative, take the next instruction from the operand address. For this the instruction address is 501, the order D, the special location address 900 and the operand address 202. If the content of the accumulator is negative then the next instruction address will be 202. This instruction will lead the machine into a microprogramme as follows.

(4) *Programme Instruction (202).*—Replace the content of the accumulator by its logical complement. For this the instruction address is 202, the order G, the special location 801 and the operand address 900. This order results in the instruction address 202 being stored on the entry address register, the content of the accumulator (address 900) is put into the operand register (address 901) and the next instruction address (801) is set up on the address counter. This leads into a microprogramme in the following manner.

(4(*a*)) *Microprogramme Instruction (801).*—Put the content of the operand register into special location (950) which performs logical functions. For this the instruction address is 801, the order B, the special location 950 and the operand address 901.

(4(*b*)) *Microprogramme Instruction (802).*—Put logical complement into the accumulator (900) and re-enter the main programme. For this the instruction address is 802, the order H, the special location 951 (which yields the logical complement of the word written into the special location address 950 by the last instruction), and the operand address 900. This order results in the logical complement being placed in the accumulator (address 900). The next instructions address will be taken from the entry address register and incremented by unity. As a result of a programme instruction 4 the address on the entry address register is 202 so that the next instruction address set up on the address counter is 203.

It will be seen from the above example that once microprogrammes, such as that at 4(*a*) and 4(*b*) above, have been set up, the main part of the programme, exemplified by instructions 1 to 4 above, is very similar to a programme for a conventional single address machine.

The apparatus required to realise the above-described alternative organisation of computing engine is somewhat similar to that described with reference to FIGURE 3 except that the register 24 of FIGURE 3 does not contain provision for a next instruction address. This is replaced by the address counter. Also an operand register and an entry address register are required together with highways and gates necessary for inplementing the orders A to H.

I claim:

1. An electrical digital computing engine comprising a store having ordinary locations and at least one block of special locations, means for transferring words from ordinary locations to special locations and from special locations to ordinary locations, the block of special locations comprising storage means for converting words written into the block of special locations into different logical functions thereof available at correspondingly different special location addresses and wherein the block of special locations has two destination addresses and at least two source addresses, each of which yields an output corresponding to a logical function of words written into the destination addresses.

2. An electrical digital computing engine as claimed in claim 1 and wherein a block of special locations has one destination address and a plurality of source addresses at least one of which yields a word written into the destination address operated upon by a logical function.

3. An electrical digital computing engine comprising a store having ordinary locations and at least one block of special locations and means for transferring words from ordinary locations to special locations and from special locations to ordinary locations and wherein the said block of special locations comprises a word-organised magnetic core store having a number of columns of single storage cores, said number of columns being equal to the number of digits in a word to be stored and a number of rows of single storage cores, each of said number of rows being threaded by a separate read wire corresponding to a different source address, the rows being threaded by a single select wire and individual magnetic core in each row being threaded by a separate write wire the significance of which is dependent on the logical function to be performed on the word written into the said block of special locations.

4. In an electrical digital computing engine, a block of special locations comprising a magnetic core store having a number of columns of single storage cores, said number of columns being equal to the number of digits in a word to be stored and a number of rows of single storage cores, each of said number of rows being threaded by a separate read wire corresponding to a different source address, the rows being threaded by a single select wire and each individual magnetic core in each row being threaded by a write wire the significance of which is dependent on the logical functions to be performed on a word written in to the block of special locations.

5. In an electrical digital computing engine, a block of special locations as claimed in claim 4 and wherein one row of the said magnetic core store is threaded by write wires in the reverse order of significance.

6. In an electrical digital computing engine, a block of special locations as claimed in claim 4 and wherein one row of the said magnetic core store is threaded with write wires in order of significance and another row is threaded by the write wires in the same order of significance but shifted one place to the left.

7. In an electrical digital computing engine, a block of special locations as claimed in claim 4 and wherein one row of the said magnetic core store is threaded with write wires in order of significance and another row is threaded by write wires in the same order of significance but shifted one place to the right.

8. In an electrical digital computing engine, a block of special locations as claimed in claim 4 and wherein one row of the said magnetic core store is threaded by the said select wire twice and each core in the row is threaded by a write wire once in the reverse sense so that the number written into the row is complemented on unity.

9. In an electrical digital computing engine, a block of special locations as claimed in claim 4 and wherein a single clear wire threads all the rows in the said magnetic core store.

10. An electrical digital computing engine comprising a store having ordinary locations and at least one block of special locations and means for transferring words from ordinary locations to special locations and from special locations to ordinary locations and wherein the said block of special locations comprises at least first, second, third and fourth rows of magnetic single cores all four of which are threaded by a read wire associated with a source address, the first and second rows being threaded once and the third and fourth rows being threaded twice by a first select wire associated with a first destination address, the second row being threaded twice and the fourth row being threaded once by a second select wire associated with a second destination address, the magnetic single cores being arranged into columns each threaded by a write wire and an output wire, the said output wires yielding the exclusive OR function of two numbers written into the first destination address and the second destination address.

11. An electrcal digital computing engine as claimed in claim 10 and wherein the said block of special locations comprises a fifth rows of single magnetic cores threaded once by the said first select wire and by a read wire associated with another source address and threaded twice by the said second select wire, the columns of the fifth row being threaded by write wires shifted one place in the direction of increasing order of significance such that output wires threading the columns yield the logical product, shifted one place in the direction of increasing order of significance, of two numbers written into the first destination address and the second destination address.

12. In an electronic digital computing engine, a block of special locations comprising at least first, second, third and fourth rows of single magnetic cores, a read wire associated with a source address threading all four rows, a first select wire associated with a first destination address threading the said first and second rows once and the said third and fourth rows twice, a second select wire associated with a second destination address threading the said second row twice and the said fourth row once, the said single magnetic cores being arranged into columns each threaded by a write wire and an output wire, the said output wires yielding the exclusive OR function of two numbers written into the first destination address and the second destination address.

13. In an electrical digital computing engine, a block of special locations as claimed in claim 12 and comprising a fifth row of single magnetic cores threaded once by the said first select wire and threaded twice by the said second select wire and a read wire threading the said fifth row of magnetic cores, the columns of the said fifth row being threaded by the said write wires shifted one place in the direction of increasing order of significance such that output wires threading the columns yield the logical product, shifted one place in the direction of increasing order of significance, of two numbers written into the said first destination address and the said second destination address.

14. An electrical digital computing engine comprising a store having a plurality of ordinary storage locations each having a different address; and having at least one block of special storage locations, common input means to said block of special storage locations, control means connected to said common input means and responsive to a single destination address for filling every storage location in said block of special storage locations with signals on said common input means a plurality of output means connected one to each of said special storage locations and to said control means and each activated by said control means in response to a different specific source address specified by an instruction word for transferring words from the special storage location to an ordinary storage location specified in said instruction word, the said block of special storage locations comprising storage means for converting words written into the block of special locations into different logical functions thereof available at correspondingly different special location addresses.

15. An electrical digital computing engine as claimed in claim 14 and wherein said control means is arranged to operate in conjunction with an instruction word having an operand address and a special location address.

16. An electrical digital computing engine as claimed in claim 15 and wherein some of the special locations have operand addresses.

References Cited

UNITED STATES PATENTS

| | | | |
|---|---|---|---|
| 3,054,986 | 9/1962 | Andrews et al. ------ | 340—172.5 |
| 3,247,489 | 4/1966 | Sussenguth -------- | 40—172.5 |

ROBERT C. BAILEY, *Primary Examiner.*

R. ZACHE, *Assistant Examiner.*